United States Patent [19]

Miller

[11] 4,301,896

[45] Nov. 24, 1981

[54] CONTROLLABLE PIVOT INCORPORATING INDEPENDENT DRAG AND LOCKING BRAKES

[75] Inventor: Robert E. Miller, Vaucluse, Australia

[73] Assignee: Universal Fluid Heads (Aust.) Pty. Ltd., Rushcutters Bay, Australia

[21] Appl. No.: 45,166

[22] Filed: Jun. 4, 1979

[51] Int. Cl.³ .............................................. F16D 65/08
[52] U.S. Cl. .................................. 188/70 R; 188/105
[58] Field of Search ................. 188/70 R, 77 R, 83, 188/105, 106 R, 106 F

[56] References Cited

U.S. PATENT DOCUMENTS

| 2,371,503 | 3/1945 | Carter | 188/70 R |
|---|---|---|---|
| 2,619,201 | 11/1952 | Crookston | 188/105 |
| 3,026,665 | 3/1962 | Hoff | 188/77 R |
| 3,362,505 | 1/1968 | Motta | 188/77 R |

FOREIGN PATENT DOCUMENTS 1435536  3/1966  France ................................ 188/105

*Primary Examiner*—Duane A. Reger
*Attorney, Agent, or Firm*—Ladas & Parry

[57] ABSTRACT

A controllable pivot specifically designed for the pan or tilt movement of a motion-picture camera support incorporating two separate braking mechanisms, the first being a drag brake adjustable to provide a controlled resistance to operation of the pivot and the second providing a pivot locking facility independent of the drag brake. In a preferred form the locking brake is a floating band brake operating in the oil of the hydraulic drag brake.

4 Claims, 2 Drawing Figures

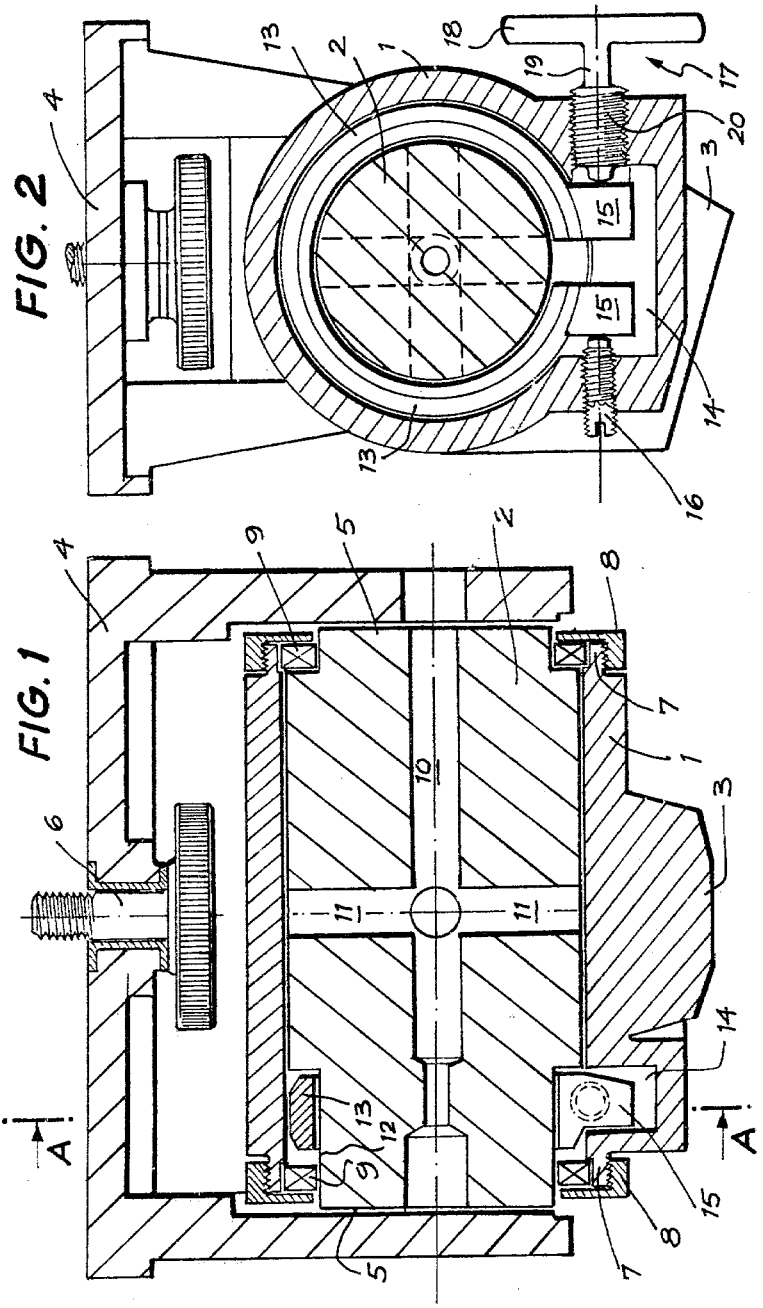

CONTROLLABLE PIVOT INCORPORATING INDEPENDENT DRAG AND LOCKING BRAKES

This invention relates to pivots and has been devised particularly though not solely as a pivot for a camera support.

In the past, pivots have been provided for the mounting of a camera such as a motion-picture camera or a television camera on a tripod or other support so that the camera may be moved through both tilting and panning operations to point the camera in the desired direction. It has been known to provide either the tilting or the panning axes, but more commonly the tilting axis, with a pivot incorporating a drag brake which may be engaged to a controllable degree to provide a predetermined resistance to movement on the tilting axis. When it is desired to lock the camera in one particular position the drag brake is engaged full-on to lock the tilting motion about the horizontal axis. This system has the disadvantage that when it is desired to again tilt the camera the drag brake must be reset to the position where the required amount of drag is provided which takes considerable time and concentration on the part of the camera man. This is, of course, a disadvantage to the efficient operation of the camera.

It is therefore an object of the present invention to provide a controllable pivot which will obviate or minimise the foregoing disadvantages in a simple yet effective manner or which will at least provide the public with a useful choice.

Accordingly, the invention consists in a controllable pivot comprising a barrel, a shaft rotatable within said barrel, a drag brake actuable between said shaft and said barrel to provide a controllable amount of resistance to rotation therebetween, and a locking brake actuable independently of said drag brake to prevent rotation between said shaft and said barrel.

Notwithstanding any other forms which may fall within its scope the invention will hereinafter be described by way of example only with reference to the accompanying drawings in which:

FIG. 1 is a cross-sectional view through the axis of a controllable pivot according to the invention; and FIG. 2 is a cross-sectional view along the line A—A of FIG. 1.

In a preferred form of the invention a controllable pivot, particularly suitable for the tilting or panning axis of a camera mount but equally adaptable to any other application in which a controllable pivot is required, is contructed as follows:

The pivot comprises a barrel 1 and a shaft 2 rotatable within the barrel. The barrel may be provided with portions 3 adapted to be engaged with a suitable mounting (not shown) and the ends of the shaft 2 may be secured to a mounting bracket 4 at the ends 5 of the shaft so that a camera or other device may be secured to the mounting bracket 4, for example, by way of engagement screw 6. The barrel is provided with shouldered recesses 7 and cover plates 8 arranged to support and contain oil seals 9 so that oil for lubrication may be contained between the shaft and the barrel. The shaft is provided with a central bore 10 and one or more crossbores 11 in which may be mounted pistons (not shown) at the outer circumferential ends of the radial bore 11 and having their outer ends arranged to frictionally engage the bore of the barrel 1. In use hydraulic fluid may be supplied through the axial bore 10 and pressurised to force the pistons in the radial bore 11 outwardly against the walls of the barrel 1. It will be appreciated that by varying the amount of hydraulic pressure supplied the reaction between the pistons and the bore of the barrel may be varied to control the amount of resistance to rotation between the shaft and the barrel. In this manner a drag brake is provided actuable between the shaft and the barrel to control the amount of resistance to rotation therebetween.

In order to provide an independent locking brake between the shaft and barrel a portion of the shaft is turned down to a reduced diameter shoulder at 12 and a brake band 13 is provided circumferentially arranged about the shoulder 12. The brake band is located in a suitable housing in the barrel 3 which is provided with a recess 14 into which the ends 15 of the brake band protrude. Alternatively the shaft may be of constant diameter throughout and the barrel may be provided with an enlarged circumferential recess to accommodate the brake band 13.

An adjusting screw 16 is provided threadedly mounted in the wall of the chamber 14 so that the position of one end of the brake band may be initially adjusted. An actuation lever 17 is provided which may, for example, comprise a handle 18 mounted on a shaft 19 which is threadedly engaged at 20 through the opposite wall of the chamber 14 from the adjustment screw 16. To engage the brake band the handle 18 is rotated to advance the shaft 19 into the housing 14 and close together the two arms 15 of the brake band. This action causes the band to contract and grip the shoulder 12 to prevent rotation of the shaft within the barrel.

Although the operation of the locking brake band has been described by way of a rotatable handle 18 it will be appreciated that other arrangements are possible, for example, a cam action lever could be used to move together the two ends 15 of the brake band.

It will be appreciated that the band brake is enclosed within the oil seals 9 and lubricated.

This has the dual advantages of keeping any dirt or other foreign matter from the workings of the band brake and also providing lubrication to ensure smooth operation and prevent binding or seizing. Because the brake band is free floating about the barrel and does not have a fixed end it is self aligning which results in economies during manufacture and reliability in operation. Where necessary a spring may be provided between the two ends 15 of the brake band to positively disengage the locking brake when the actuation lever 17 is released.

In this manner a controllable pivot is provided which has two independent braking means. Firstly, there is provided a drag brake which may be preset by a variable degree of hydraulic pressure to provide a predetermined amount of resistance of rotation between the barrel and the shaft, and secondly a band brake is provided which enables the rotation of the shaft in the barrel to be locked at any time independently of the operation of the drag brake. This arrangement has the advantage that the drag brake may be preset for a required operation and the setting need not be interfered with when it is desired to lock the pivot.

What I claim is:

1. A controllable pivot comprising a barrel, a shaft rotatable within said barrel, a drag brake actuable between said shaft and said barrel to provide a controllable amount of resistance to rotation therebetween, and a locking brake actuable independently of said drag brake to prevent rotation between said shaft and said barrel, said locking brake being a floating band brake comprising a band arranged to substantially encircle said shaft, and two free ends extending outwardly from said band away from said shaft, one first said free end being arranged to abut an abutment in or on said barrel and the other second said free end being movable towards said first free end by way of an actuation lever to cause said band to contract and grip said shaft.

2. A controllable pivot as claimed in claim 1 wherein said abutment is adjustable toward and away from said second free end.

3. A controllable pivot as claimed in claim 1 wherein said drag brake comprises a hydraulically operable brake having one or more radial bores in said shaft, each said bore incorporating a piston slidable therein so that the outer ends of said pistons bear against the inner circumferential surface of said barrel, and conduits connecting said bores to a supply of hydraulic fluid which may be pressurised to force said pistons outwardly to bear against said barrel.

4. A controllable pivot comprising a barrel, a shaft rotatable within said barrel, a drag brake actuable between said shaft and said barrel to provide a controllable amount of resistance to rotation therebetween, said drag brake comprising a hydraulically operable brake having one or more radial bores in said shaft, each said bore incorporating a piston slidable therein so that the outer ends of said pistons bear against the inner circumferential surface of said barrel, and conduits connecting said bores to a supply of hydraulic fluid which may be pressurised to force said pistons outwardly to bear against said barrel, a locking brake actuable independently of said drag brake to prevent rotation between said shaft and said barrel, said locking brake comprising a floating band brake comprising a band arranged to substantially encircle said shaft, and two free ends extending outwardly from said band away from said shaft, one first said free end being arranged to abut an abutment in or on said barrel and the other second said free end being movable towards said first free end by way of an actuation lever to cause said band to contract and grip said shaft, and wherein oil seals are provided towards both ends of said barrel between said barrel and said shaft and said locking brake is positioned between said oil seals so that said locking brake operates in a bath of the hydraulic oil used to actuate said drag brake.

* * * * *